(12) United States Patent
   Shiotani et al.

(10) Patent No.: US 10,970,020 B2
(45) Date of Patent: Apr. 6, 2021

(54) NON-TRANSITORY COMPUTER-READABLE RECORDING MEDIUM STORING COMPUTER-READABLE INSTRUCTIONS FOR CAUSING INFORMATION PROCESSING DEVICE TO EXECUTE IMAGE PROCESS, AND INFORMATION PROCESSING DEVICE

(71) Applicant: BROTHER KOGYO KABUSHIKI KAISHA, Nagoya (JP)

(72) Inventors: Takeshi Shiotani, Nagoya (JP); Susumu Fujiwara, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/442,958

(22) Filed: Jun. 17, 2019

(65) Prior Publication Data

US 2019/0303074 A1    Oct. 3, 2019

Related U.S. Application Data

(63) Continuation of application No. 15/630,526, filed on Jun. 22, 2017, now Pat. No. 10,338,867.

(30) Foreign Application Priority Data

Jun. 24, 2016    (JP) .................................. 2016-125785

(51) Int. Cl.
   *G06F 3/12*    (2006.01)
   *G06F 9/451*   (2018.01)
   (Continued)

(52) U.S. Cl.
   CPC .......... *G06F 3/1253* (2013.01); *G06F 3/1205* (2013.01); *G06F 3/1288* (2013.01);
   (Continued)

(58) Field of Classification Search
   None
   See application file for complete search history.

(56) References Cited

U.S. PATENT DOCUMENTS

2002/0097408 A1    7/2002   Chang et al.
2010/0083181 A1*   4/2010   Matsushima ......... G06F 3/0485
                                                   715/835
(Continued)

FOREIGN PATENT DOCUMENTS

JP    2012-203742 A    10/2012

OTHER PUBLICATIONS

Office Action dated May 17, 2018 from parent U.S. Appl. No. 15/630,526.

(Continued)

*Primary Examiner* — Frantz Bataille
(74) *Attorney, Agent, or Firm* — Scully Scott Murphy and Presser (57) ABSTRACT

An information processing device may read, from a shared storing area, first identification information indicating K pieces of first applications that are already installed. The information processing device may display first screen on the display. The information processing device may cause an operating system to display the K pieces of first images in the first screen. Each of K pieces of link information may be associated with a corresponding one of the K pieces of first images. When any one of the K pieces of first images receives an input operation, the operating system may activate the corresponding first application indicated by the link information associated with the first image that receives the input operation.

12 Claims, 8 Drawing Sheets

(51) Int. Cl.
*G06F 8/61* (2018.01)
*G06F 8/71* (2018.01)

(52) U.S. Cl.
CPC ............... *G06F 8/61* (2013.01); *G06F 8/62* (2013.01); *G06F 8/71* (2013.01); *G06F 9/451* (2018.02); *G06F 3/1225* (2013.01); *G06F 3/1292* (2013.01)

(56) References Cited

U.S. PATENT DOCUMENTS

| | | | |
|---|---|---|---|
| 2012/0243043 A1 | 9/2012 | Asai | |
| 2014/0075391 A1* | 3/2014 | Tsuda | G06F 3/0482 |
| | | | 715/840 |
| 2014/0115485 A1* | 4/2014 | Gao | G06F 9/451 |
| | | | 715/738 |
| 2014/0365628 A1* | 12/2014 | Tamura | G06F 9/445 |
| | | | 709/223 |
| 2015/0163371 A1 | 6/2015 | Asai | |

OTHER PUBLICATIONS

Office Action dated Oct. 19, 2018 from parent U.S. Appl. No. 15/630,526.
Notice of Allowance dated Feb. 21, 2019 from parent U.S. Appl. No. 15/630,526.

* cited by examiner

| Data No. | App. ID | App. Name | Activated Date | Activation Number | Installation State | Version | App. URL | Icon Info. |
|---|---|---|---|---|---|---|---|---|
| 1 | A0001 | Map Print | — | 0 | Installed | 1.0.1 | http://brother.co.jp/ips/apps/mapprint | — |
| 2 | A0002 | Business Card Print | 2014/05/01 15:35 | 6 | Not Installed | 1.4 | http://brother.co.jp/ips/apps/cardprint | XXX |
| 3 | A0003 | CD Label Print | 2016/02/05 18:50 | 11 | Installed | 2.1 | http://brother.co.jp/ips/apps/cdlabel | YYY |
| 4 | A0004 | Photo Print | 2016/05/30 16:15 | 30 | Installed | 3.2 | http://brother.co.jp/ips/apps/photoprint | ZZZ |

| Data No. | App. ID | App. Name | Activated Date | Activation Number | Version | App. URL | Icon Info. |
|---|---|---|---|---|---|---|---|
| | 301 | 302 | 303 | 304 | 306 | 307 | 308 |
| 1 | A0001 | Map Print | — | 0 | 1.0.1 | http://brother.co.jp/ips/apps/mapprint | — |
| 2 | A0003 | CD Label Print | 2016/02/05 18:50 | 11 | 2.1 | http://brother.co.jp/ips/apps/cdlabel | YYY |
| 3 | A0004 | Photo Print | 2016/05/30 16:15 | 30 | 3.2 | http://brother.co.jp/ips/apps/photoprint | ZZZ |

NON-TRANSITORY COMPUTER-READABLE RECORDING MEDIUM STORING COMPUTER-READABLE INSTRUCTIONS FOR CAUSING INFORMATION PROCESSING DEVICE TO EXECUTE IMAGE PROCESS, AND INFORMATION PROCESSING DEVICE

CROSS-REFERENCE TO RELATED APPLICATION

This application is a continuation application of U.S. patent application Ser. No. 15/630,526 filed on Jun. 22, 2017 and claims priority under 35 U.S.C. § 119 from Japanese Patent Application No. 2016-125785 filed on Jun. 24, 2016. The entire subject matter of the applications is incorporated herein by reference.

TECHNICAL FIELD

The technique disclosed herein relates to an information processing program stored in a computer-readable non-transitory medium, which allows suitable cooperation among plural applications.

BACKGROUND

A technology called "deep link" is known. By using the deep link technology, a second application can be activated in an information processing device via a first application, which is already activated therein.

SUMMARY

A case will be considered in which an icon image for accepting an input of an instruction to activate the second application using the deep link technology is to be displayed in a display screen of the first application. At this occasion, if the second application is not yet installed in the information processing device, the second application cannot be activated even if a user inputs an activation instruction by using the icon image. This becomes problematic, since it may confuse the user as to what will and will not happen according to the user's input.

One technique disclosed in the present application is a non-transitory computer-readable recording medium storing computer-readable instructions that configure an information processing instructions for an information processing device. The information processing device may comprise: a memory; a display; and a user interface. The information processing device may be installed with an operating system configured to control the memory, the display, and the user interface. The computer-readable instructions, when executed by a controller of the information processing device, may cause the information processing device to perform reading K pieces of first identification information from a shared storing area. K may be an integer equal to or greater than one and equal to or less than L. L may be an integer equal to or greater than one. The shared storing area may be a storing area in the memory, and may be a storing area accessible for the information processing instructions and the L pieces of applications. The K pieces of first identification information may indicate K pieces of first applications that are included in L pieces of applications. The K pieces of first applications may be already installed in the information processing device. Each of the K pieces of first identification information may be information stored in the shared storing area by a corresponding one of the K pieces of first application. The computer-readable instructions may cause the information processing device to perform displaying first screen on the display. The computer-readable instructions may cause the information processing device to perform causing the operating system to display K pieces of first images in the first screen displayed by the displaying. Each of the K pieces of first images may indicate a corresponding one of the K pieces of first applications that correspond to the K pieces of first identification information read by the reading. Each of K pieces of link information may be associated with a corresponding one of the K pieces of first images by the information processing instructions. Each of the K pieces of link information may indicate the corresponding one of the K pieces of first applications. When any one of the K pieces of first images receives an input operation via the user interface, the operating system may activate the corresponding first application indicated by the link information associated with the first image that receives the input operation.

BRIEF DESCRIPTION OF DRAWINGS

FIG. 2 shows an operational flow diagram of a printing app 21a;
FIG. 3 shows an operational flow diagram of the printing app 21a;
FIG. 8 shows an example display of a main screen G1a.

DETAILED DESCRIPTION

Figure 1:
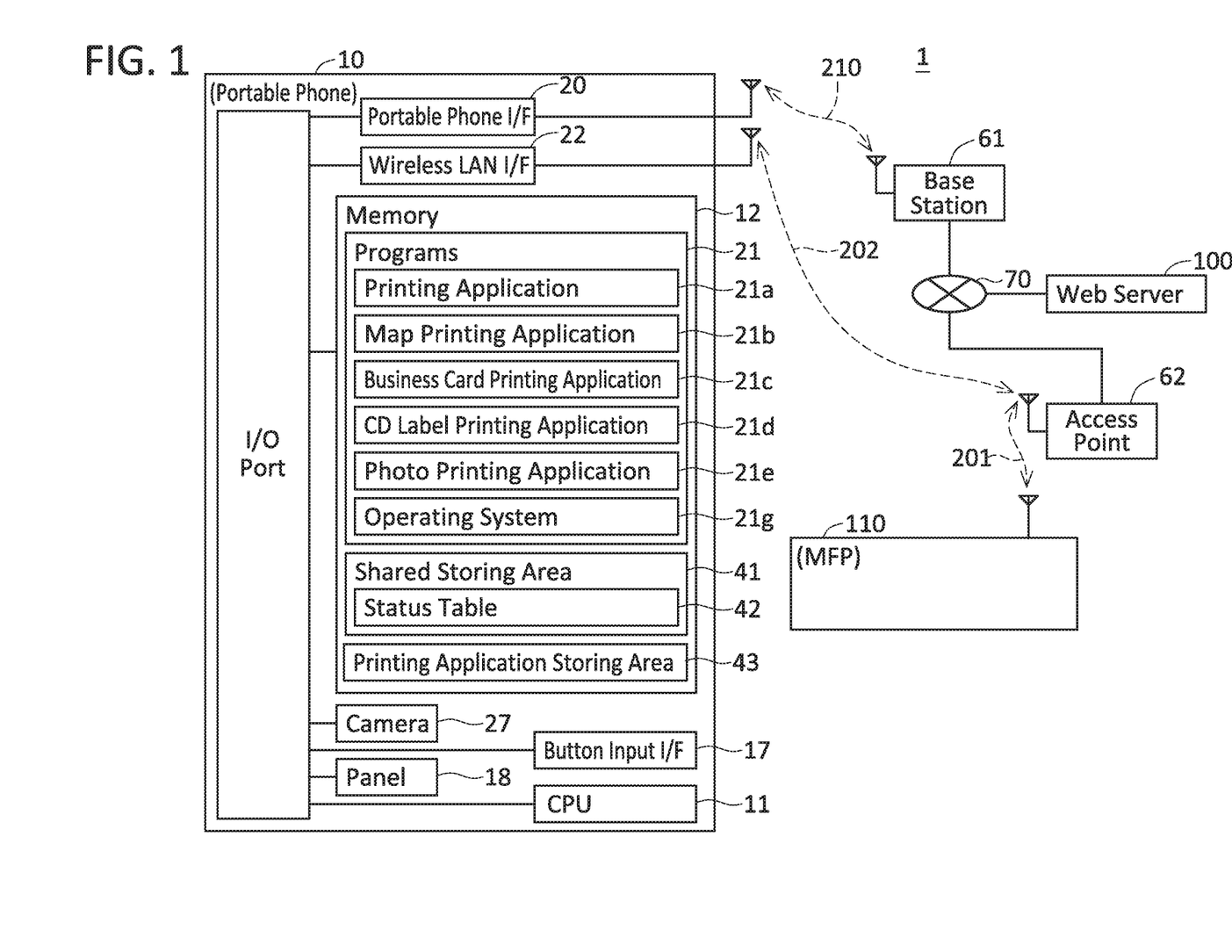
FIG. 1 shows a configuration of a communication system.

First Embodiment (Configuration of Communication System)
FIG. 1 shows a block diagram of a communication system 1 exemplified as an embodiment of the present disclosure. The communication system 1 includes a portable phone 10, an MFP (referred to as Multi-Function Peripheral) 110, an access point 62, a web server 100, and a base station 61. The access point 62 is a known relay.

The web server 100 is capable of communicating with the portable phone 10 via the Internet 70 and the base station 61. The web server 100 stores various applications, such as a printing application 21a to a photo printing application 21e. Further, it also stores latest version information of the various applications. The MFP 110 is capable of communicating with the portable phone 10 through wireless communications 202 and 201.

The portable phone 10 is a portable phone installed with an iOS (registered trademark) platform. The portable phone 10 primarily includes a CPU 11, a memory 12, a button input I/F 17, a panel 18, a portable phone interface 20, a wireless LAN interface 22, and a camera 27. The CPU 11 controls respective functions according to programs stored in the memory 12 and various signals sent and received via the portable phone I/F 20. Further, the CPU 11 realizes respective functions by reading programs. In this description, an interface may be denoted as "I/F".

The portable phone I/F 20 performs a wireless communication 210 with the base station 61. The wireless communication 210 may be a cellular scheme wireless communication, such as 3G or 4G. The wireless LAN I/F 22 performs communication with the access point 62 through the wireless communication 202. The button input I/F 17 includes keys for executing respective functions of the portable phone 10. The button input I/F 17 may be configured integrally with the panel 18 as a touch panel. The panel 18 displays various types of function information of the portable phone 10.

The memory 12 includes programs 21, a shared storing area 41, a printing application storing area 43, and the like. Notably, the memory 12 may be configured by a combination of a RAM, a ROM, a flash memory, a hard disk, and the like.

The programs 21 include a printing application 21*a*, a map printing application 21*b*, a business card printing application 21*c*, a CD label printing application 21*d*, a photo printing application 21*e*, and an OS 21*g*. The OS 21*g* is an operating system under the iOS platform. Each of the printing application 21*a* to the photo printing application 21*e* is an application designed for iOS. Notably, in this description, an application may be denoted in abbreviation "app".

The printing app 21*a* is an app for causing the MFP 110 to perform printing. The map printing app 21*b* to the photo printing app 21*e* are apps for causing the MFP 110 perform printing of a map, a business card, a CD label, and a photo, respectively. The printing app 21*a* to the photo printing app 21*e* may be downloaded from the web server 100 on the Internet 70 and installed in the portable phone 10. Alternatively, the printing app 21*a* to the photo printing app 21*e* may be stored in a media that is shipped with the MFP 110, and they may be installed in the portable phone 10 from this media.

The OS 21*g* is a program that provides basic functions utilized mutually among the printing app 21*a* to the photo printing app 21*e*. Further, the OS 21*g* has a function to control activations of the printing app 21*a* to the photo printing app 21*e*, and a function to manage data transmission among the printing app 21*a* to the photo printing app 21*e*. Further, the OS 21*g* has a function to control respective constituent elements, such as the memory 12, the button input I/F 17, the panel 18, and the like.

Further, the OS 21*g* is provided with functions that are called a deep link function and a WebView function. The deep link function is a function that allows the OS 21*g* to activate a second app when it receives an instruction to activate the second app in a first app, which is running in the portable phone 10. The WebView function is a function that allows the OS 21*g* to display a web page on a screen of the app that is running in the portable phone 10.

The shared storing area 41 is a storing area configured accessible for each of the printing app 21*a* to the photo printing app 21*e*. The shared storing area 41 stores a status table 42.

Figure 6:
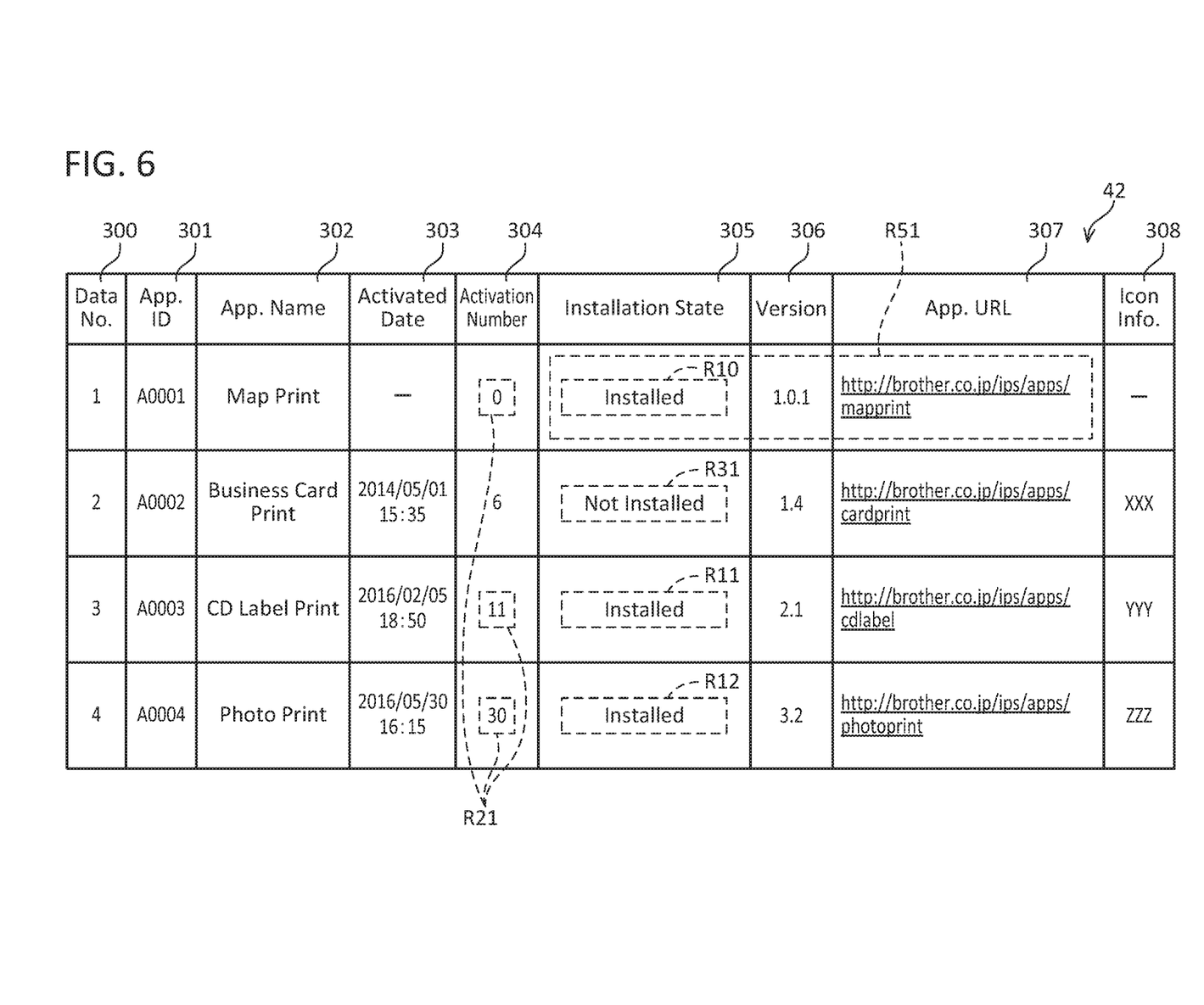
FIG. 6 shows an example of a status table 42 to be used in a first embodiment.

The status table 42 is a table that stores various types of information regarding plural activatable apps. An activatable app refers to an app that is capable of accepting an input of an activation instruction in a display screen of the printing app 21*a*. An example of the status table 42 used in the first embodiment is shown in FIG. 6. In this explanatory example of the first embodiment, a case will be described in which the map printing app 21*b* to the photo printing app 21*e* are stored in the status table 42 as activatable apps. These activatable apps may be preset by a provider of the printing app 21*a*. Further, a content of each activatable app may be capable of being updated subject to a version update of the printing app 21*a*.

The status table 42 stores a data number 300, an app ID 301, an app name 302, am activated date 303, an activation number 304, an installation state 305, a version 306, an app URL 307, and an icon information 308. The data number 300 is a serial number of identifying each of plural apps. The app ID 301 is identification information for identifying each of plural apps that the printing app 21*a* can activate. The app name 302 is a name of each app. The activated date 303 is information indicating date when each app was activated the last time. The activation number 304 is a total number of times that each app has been activated in the past. The installation state 305 is information indicating whether or not each app is installed in the portable phone 10. The version 306 is information indicating versions of the currently installed apps, and versions of already-uninstalled apps at the time when they were uninstalled. The app URL 307 is information to be read by the OS 21*g*. The app URL 307 is information capable of causing the OS 21*g* to execute a "web page display process" or an "app activation process". Contents thereof will be described later. The icon information 308 is information indicating a path to a location where an app icon image indicating each app is stored.

The printing app storing area 43 is a storing area that is dedicated to an access from the printing app 21*a*. The printing app storing area 43 stores icon generation information. The icon generation information is information indicating whether or not an app icon image is generated for each of the map printing app 21*b* to the photo printing app 21*e*. An app icon image is an image that is generated when an app is installed in the portable phone 10. Thus, the icon generation information is also information that indicates whether or not each of the map printing app 21*b* to the photo printing app 21*e* has ever been installed in the portable phone 10 in the past.

(Operation of Printing App 21*a*)

Figure 2:
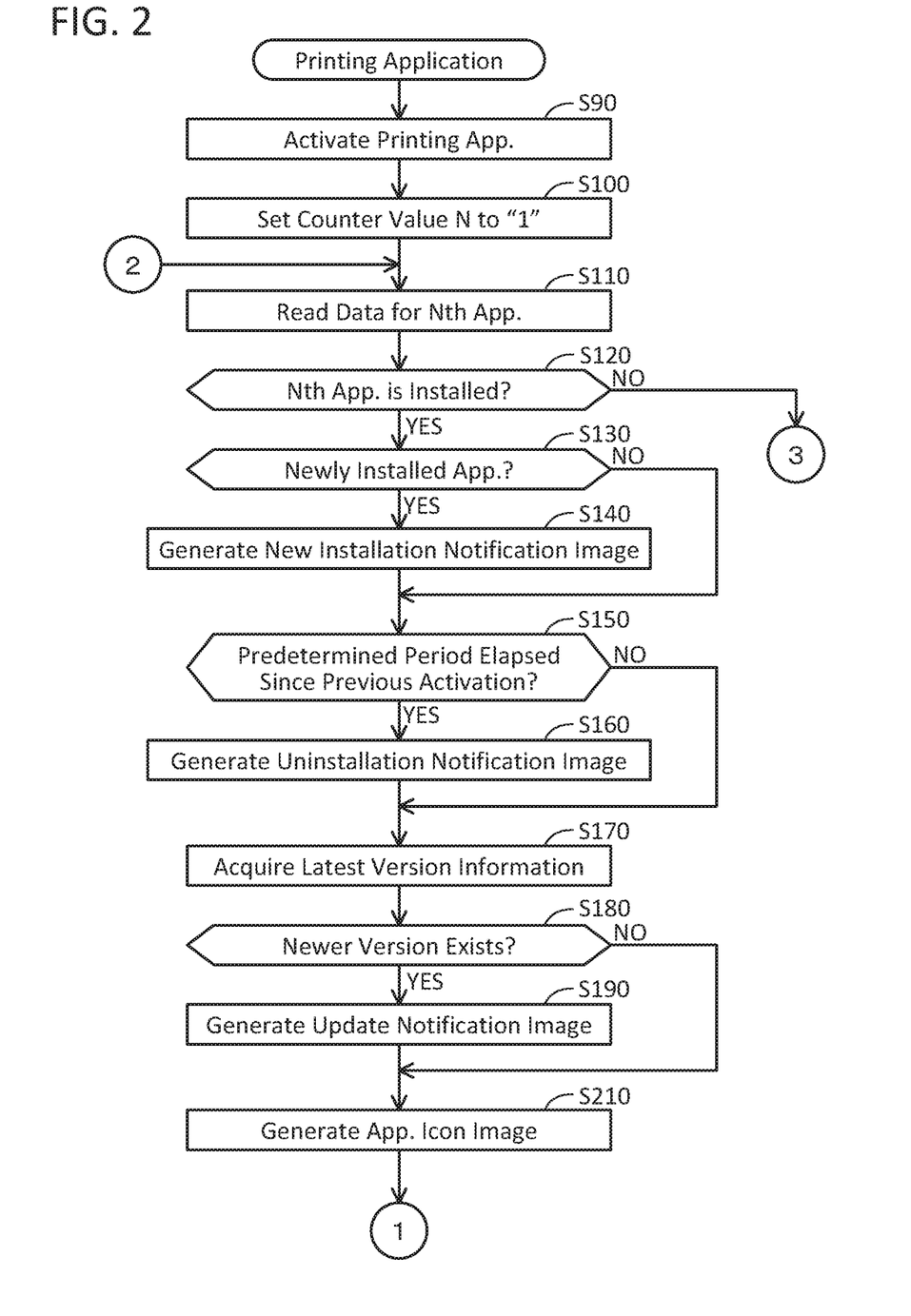
Figure 3:
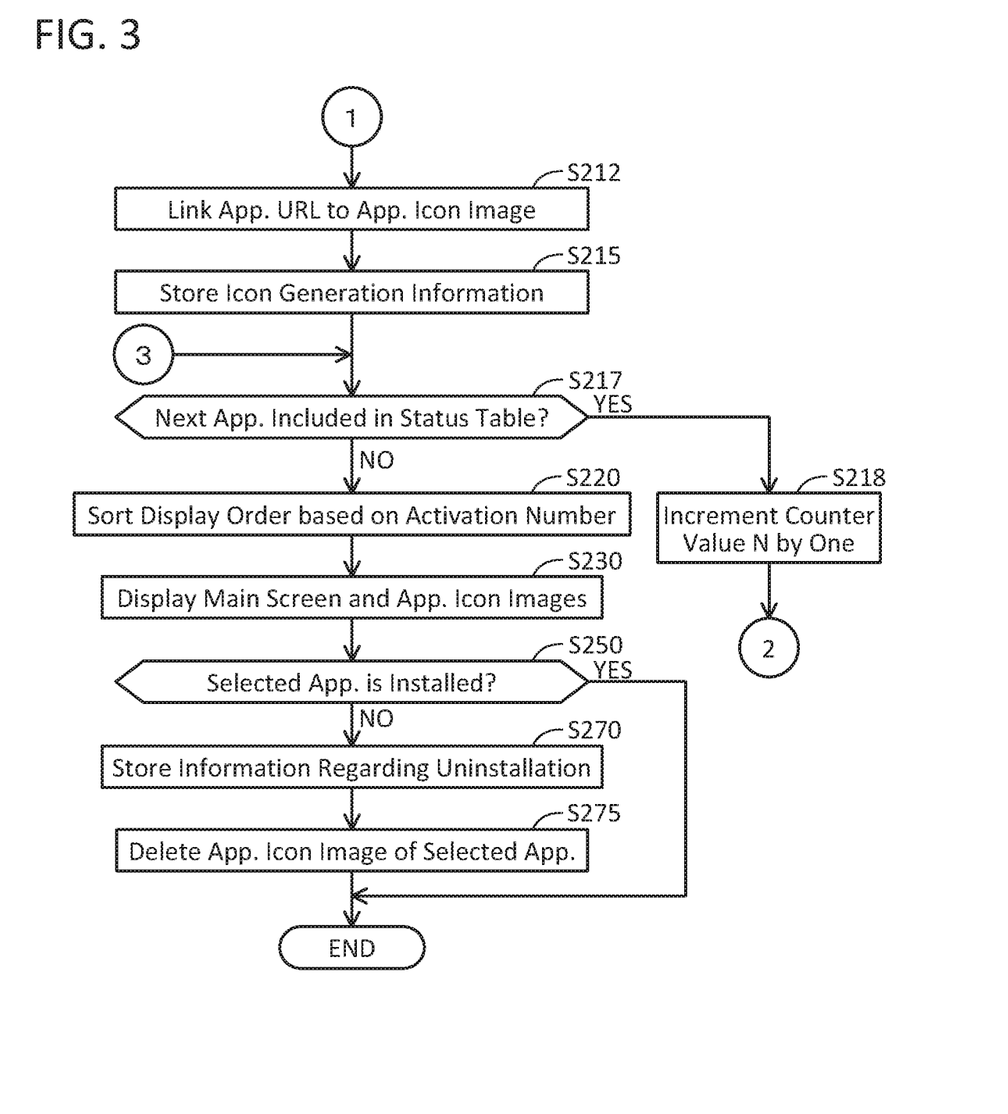

An operation of the printing app 21*a* will be described with reference to FIGS. 2 and 3. In the explanatory example of the first embodiment, the case of using the status table 42 of FIG. 6 will be described. Hereinbelow, the CPU 11 executing programs such as the apps or the OS 21*g* may simply be described by a program name For example, the description "the printing app 21*a*" may mean "the CPU 11 executing the printing app 21*a*".

In S90, when a user inputs an operation to activate the printing app 21*a* via the button input I/F 17, the OS 21*g* activates the printing app 21*a*. In S100, the printing app 21*a* sets a counter value N to "1".

In S110, the printing app 21*a* specifies an Nth app, which corresponds to an Nth data number 300 in the status table 42 in FIG. 6. Then, the printing app 21*a* reads the app ID 301, the activated date 303, the installation state 305, and the version 306 of the Nth app. Further, the printing app 21*a* reads the icon generation information from the printing app storing area 43.

In S120, the printing app 21*a* determines whether or not the Nth app is installed in the portable phone 10 based on the installation state 305 that was read. In a case of an affirmative determination (S120: Y), the printing app 21*a* proceeds to S130.

In S130, the printing app 21*a* determines whether or not the Nth app is a newly installed app. This determination procedure will be described. One or more apps, for which app icon images are already generated, may be specified based on the icon generation information read in S110. The one or more apps for which app icon images are already generated means that they are apps that had once been installed in the past in the portable phone 10. Further, if the Nth app is included in the one or more apps for which app icon images are already generated, it can be determined that the Nth app is not an app that is newly installed (S130: NO). The printing app 21*a* then proceeds to S150. On the other hand, if the Nth app is not included in the one or more apps for which app icon images are already generated, it is determined that the Nth app is an app that is newly installed (S130: YES), and the printing app 21*a* proceeds to S140.

In S140, the printing app 21*a* generates a new installation notification image for the Nth app. The new installation notification image is an image for notifying the user that the Nth app is an app that is newly installed. In the explanatory example of the first embodiment, a case will be described in which the new installation notification image is generated for the map printing app 21*b*.

In S150, the printing app 21*a* determines whether or not a predetermined period (e.g., 180 days) has elapsed since the previous activation of the Nth app based on the activated date 303 that has been read. In a case of a negative determination (S150: NO) the printing app 21*a* proceeds to S170, and in a case of an affirmative determination (S150: YES), the printing app 21*a* proceeds to S160. In S160, the printing app 21*a* generates an uninstallation notification image. The uninstallation notification image is an image for notifying the user that the Nth app might have already been uninstalled. Then, the printing app 21*a* proceeds to S170. In the explanatory example of the first embodiment, a case will be described in which the uninstallation notification image is generated for the CD label printing app 21*d*.

In S170, the printing app 21*a* acquires the latest version information of the Nth app from the web server 100 via the portable phone I/F 20. In S180, the printing app 21*a* determines whether or not a newer version than the currently installed version exists for the Nth app. This determination is performed by comparing the version indicated by the version 306 read in S110 and the latest version acquired in S170. In a case of a negative determination (S180: NO), the printing app 21*a* proceeds to S210, and in a case of an affirmative determination (S180: YES), the printing app 21*a* proceeds to S190.

In S190, the printing app 21*a* generates an update notification image. The update notification image is an image for notifying the user that there is a newer version of the Nth app than the currently installed version. Then, the printing app 21*a* proceeds to S210. In the explanatory example of the first embodiment, a case will be described in which the update notification image is generated for the photo printing app 21*e*.

In S210, the printing app 21*a* generates an app icon image of the Nth app. For example, if a path of a storage location of an app icon image is included in the icon information 308, the app icon image may be read from the storage location. Further, if the path of the storage location of the app icon image is not included in the icon information 308, an app icon image may newly be generated. In S212, the printing app 21*a* links the app URL 307 of the Nth app to the app icon image generated in S210. In S215, the printing app 21*a* stores icon generation information in the printing app storing area 43. The icon generation information indicates that the app icon image has been generated for the Nth app.

In S217, the printing app 21*a* determines whether or not an app corresponding to a next data number 300 is stored in the status table 42. In a case of an affirmative determination (S217: YES) the printing app 21*a* proceeds to S218, and the printing app 21*a* increments the counter value N by one, and then returns to S110. On the other hand, in a case of a negative determination (S217: NO), it is determined to be a case where a process to extract an installed app, which has been installed in the portable phone 10, is completed, and the printing app 21*a* proceeds to S220.

In the explanatory example of the first embodiment, in the status table 42 of FIG. 6, the installation states 305 of the map printing app 21*b*, the CD label printing app 21*d*, and the photo printing app 21*e* are "installed" (see regions R10 to R12). Thus, the three apps, namely the map printing app 21*b*, the CD label printing app 21*d*, and the photo printing app 21*e*, are extracted as the installed apps.

In S220, the printing app 21*a* sorts a display order of the installed apps based on their activation numbers 304. For example, the display order may be sorted to display apps with greater activation numbers 304 at higher positions. In the explanatory example of the first embodiment, as shown in the status table 42 of FIG. 6, the photo printing app 21*e*, the CD label printing app 21*d*, and the map printing app 21*b* have the activation numbers 304 that compare in this order (see region R21). Thus, the display order of the photo printing app 21*e*, the CD label printing app 21*d*, and the map printing app 21*b* respectively becomes "1st", "2nd", and "3rd".

Figure 7:
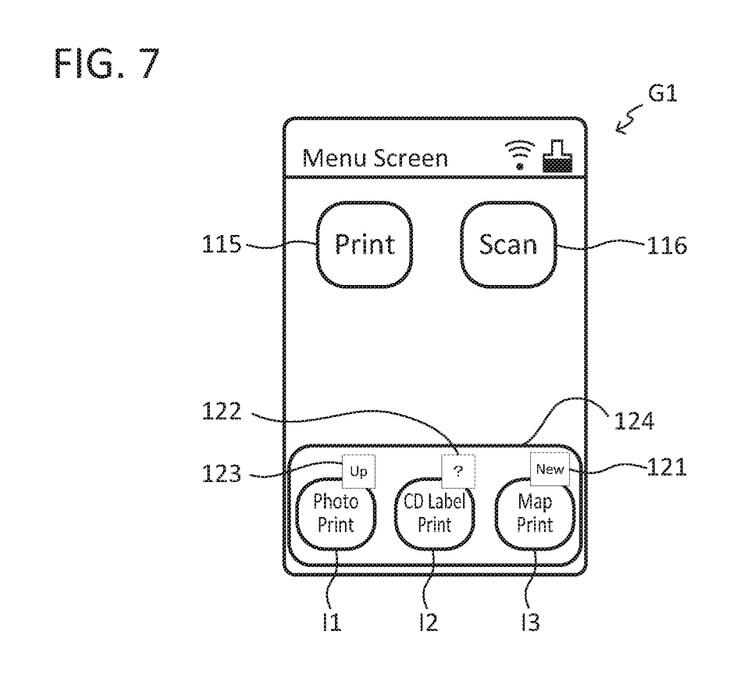
FIG. 7 shows an example display of a main screen G1.

In S230, the printing app 21*a* displays a main screen G1 on the panel 18. Further, the printing app 21*a* calls the WebView function of the OS 21*g* and causes the OS 21*g* to display the app icon images generated in S210. Specifically, the app icon images are displayed in a web page display region 124 in the main screen G1. The app icon images are displayed with greater priority for app icon images with higher display order. FIG. 7 shows a display example of the main screen G1. The main screen G1 includes button images 115 and 116 and app icon images I1 to I3. Each of the button images 115 and 116 is an image for accepting an input of an instruction for causing the MFP 110 to execute corresponding one of print process and scan process. The app icon images I1 to I3 are app icon images indicating the installed apps. Further, the app icon images I1 to I3 are displayed in order from the left side, starting with images with the higher display order. That is, the app icon image I1 corresponds to the photo printing app 21*e*, the app icon image I2 corresponds to the CD label printing app 21*d*, and the app icon image I3 corresponds to the map printing app 21*b*.

Further, in any of cases where the new installation notification image (S140) is generated, the uninstallation notification image is generated (S160), and the update notification image is generated (S190), the printing app 21*a* causes the OS 21*g* to display such. Specifically, by causing the OS 21*g* to use the WebView function, the image(s) thereof can be displayed in the web page display region 124. In the explanatory example of the first embodiment, as shown in FIG. 7, the new installation notification image 121 is displayed in a part of a region for the app icon image I3. Further, the uninstallation notification image 122 is displayed in a part of a region for the app icon image I2. Further, the update notification image 123 is displayed in a part of a region for the app icon image I1.

(Operation of OS 21*g*)

Figure 4:
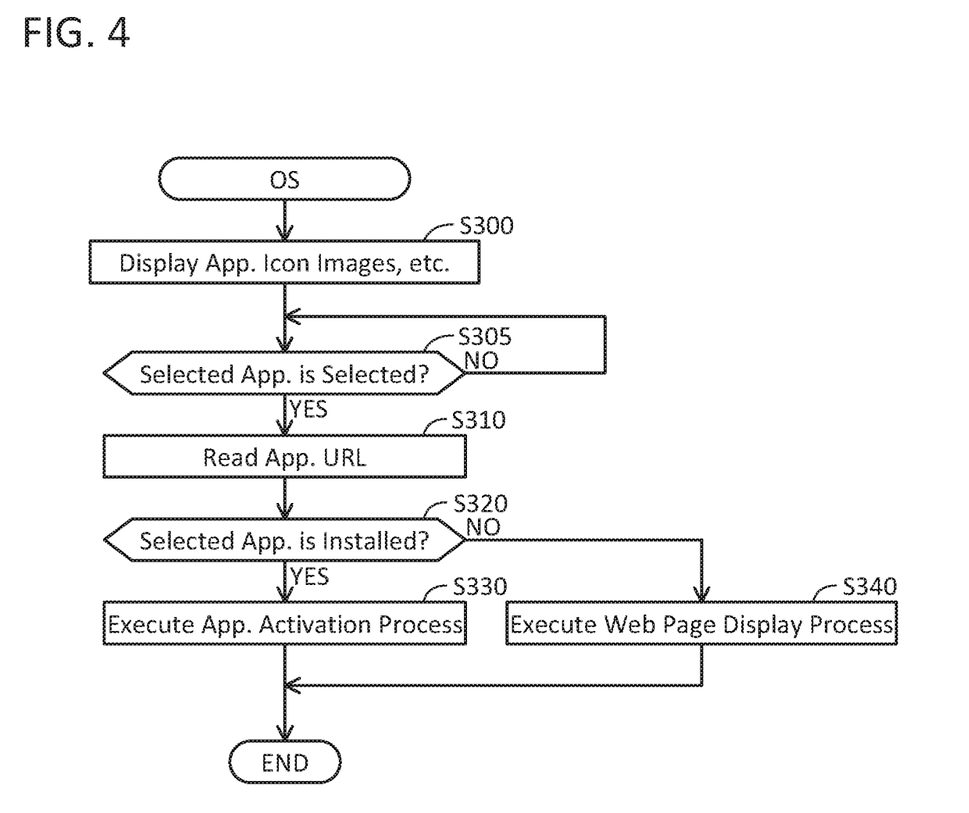
FIG. 4 shows an operational flow diagram of an OS 21g.

Hereinbelow, the operation of the OS 21*g* when the main screen G1 of FIG. 7 is displayed will be described with reference to FIG. 4. A flow diagram of FIG. 4 is triggered when the printing app 21*a* calls the WebView Function in S230 as aforementioned. In S300, the OS 21*g* display the app icon images generated in S210 in the web page display region 124. Further, if the new installation notification image (S140), the uninstallation notification image (S160), and/or the update notification image (S190) were generated, the OS 21g displays the images thereof in the web page display region 124. In S305, the OS 21g determines whether or not a selected app is selected. This determination is performed by detecting whether or not an operation to select one of the app icon images I1 to I3 is inputted. In a case of a negative determination (S305: NO), the OS 21g returns to S305, and in a case of an affirmative determination (S305: YES), the OS 21g proceeds to S310.

In S310, the OS 21g reads the app URL 307 associated with the selected app based on the associated relationship of the app URL and the selected app that were linked in S212. In S320, the OS 21g determines whether or not the selected app associated with the app URL 307 is already installed in the portable phone 10. In a case of an affirmative determination (S320: YES), the OS 21g proceeds to S330. In S330, the OS 21g executes an app activation process. The app activation process is a process using the aforementioned deep link function to activate the app to which the app URL 307 is associated. Thereafter, the OS 21g terminates the flow.

Figure 8:
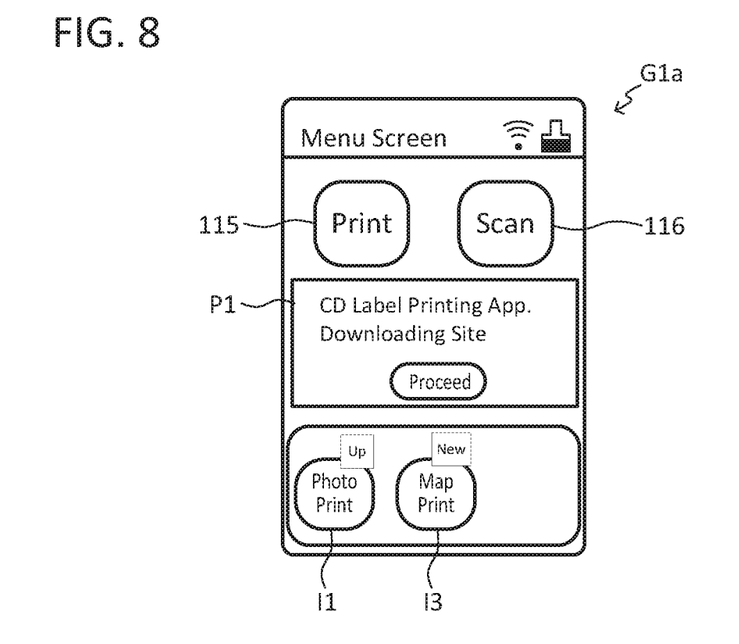

On the other hand, in S320, in a case of a negative determination (S320: NO), the OS 21g proceeds to S340. In S340, the OS 21g executes a web page display process. The web page display process is a process using the aforementioned WebView function to display a web page according to the app URL 307 in a display screen of the selected app. Due to this, as shown in a display example of FIG. 8, a web page P1 is displayed. The web page P1 may display a page for installing an app, which had been determined as not installed in S250, to the portable phone 10. Thereafter, the OS 21g terminates the flow.

Returning to FIG. 3, the process by the printing app 21a will be described. In S250, the printing app 21a determines whether or not the selected app is installed in the portable phone 10. A method of determination thereof will be described. The printing app 21a detects whether or not the web page corresponding to the app URL 307 has been displayed in the display screen of the printing app 21a by the WebView function provided by the OS 21g. When the display of the web page is not detected, such is a case where the OS 21g used the deep link function to execute the "app activation process". Thus, it can be determined in this case that the selected app is installed in the portable phone 10 (S250: YES). Then, the printing app 21a terminates the flow. On the other hand, when the display of the web page is detected, such is a case where the OS 21g used the WebView function to execute the "web page display process". Thus, it can be determined in this case that the selected app is not installed in the portable phone 10 (S250: NO). Then, the printing app 21a proceeds to S270.

In S270, the printing app 21a stores information in the status table 42 that the selected app is uninstalled. Specifically, the installation state 305 of the selected app in the status table 42 is changed from "installed" to "not installed". In S275, the printing app 21a deletes, form among the displayed app icon images, the app icon image of the selected app that has been found to have been uninstalled. Specifically, the printing app 21a calls the WebView function of the OS 21g once again. Then, it causes the OS 21g to display the web page with the uninstalled-app icon image deleted in the web page display region 124 within the main screen G1. Then, the printing app 21a terminates the flow.

In the explanatory example of the first embodiment, a case will be described in which the CD label printing app 21d has been uninstalled under a state in which the uninstallation of the CD label printing app 21d has not yet been reflected in the installation state 305 (see FIG. 6, region R11). Further, a case will be described in which the CD label printing app 21d is selected as the selected app in S305. In such a case, the app URL 307 of the CD label printing app 21d is read by the OS 21g (S310). The OS 21g detects that the CD label printing app 21d is not installed in the portable phone 10 (S320: NO), and executes the web page display process (S340). The printing app 21a can determine that the CD label printing app 21d is not installed in the portable phone 10 (S250: NO) by detecting the display of the web page. Thus, the printing app 21a changes the installation state 305 (see region R11) of the CD label printing app 21d from "installed" to "not installed" (S270). Further, the printing app 21a deletes the app icon image I2 of the CD label printing app 21d (S275). Due to this, a state is achieved as shown in a main screen G1a shown in FIG. 8, in which the app icon images I1 and I3 are displayed.

(Operations of Map Printing App 21b to Photo Printing App 21e)

Figure 5:
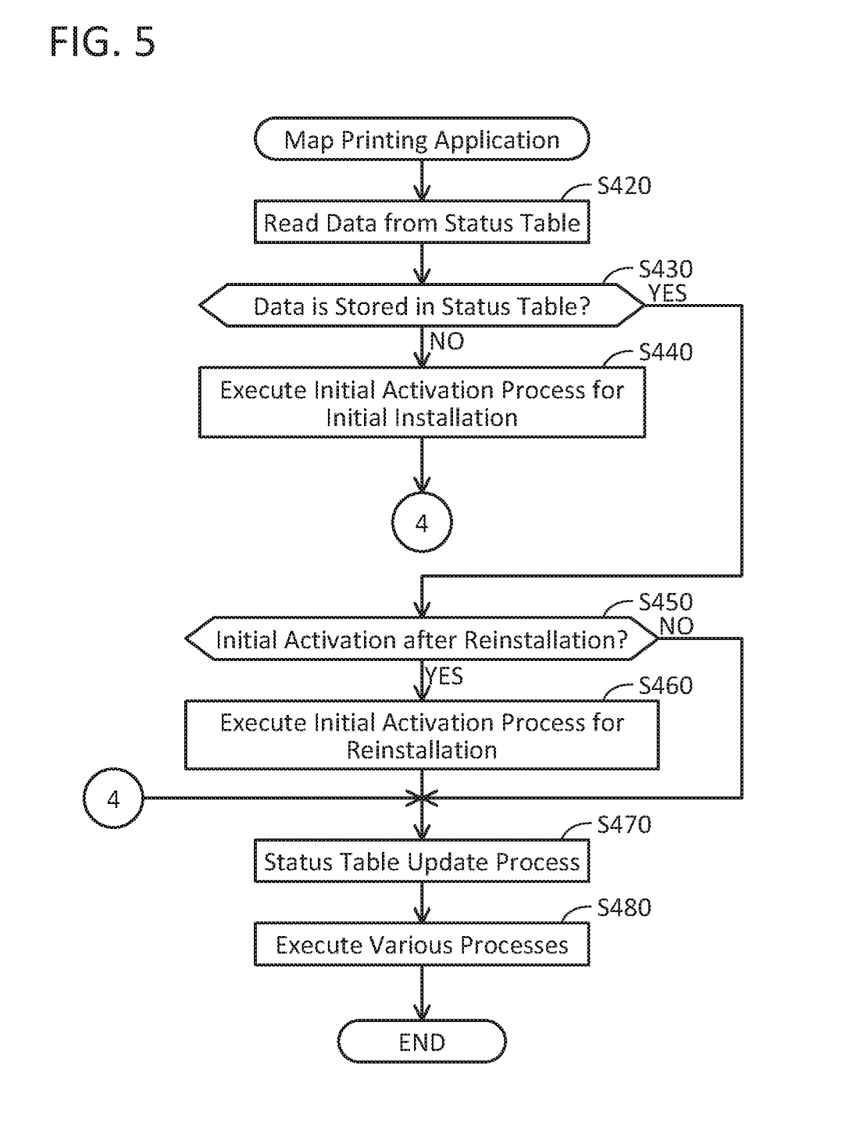
FIG. 5 shows an operational flow diagram of a map printing app 21b.

Operations of the map printing app 21b to the photo printing app 21e will be described using FIG. 5. Flow shown in FIG. 5 is triggered when the OS 21g executed the app activation process in S330 as aforementioned. In the explanatory example herein, a case in which the map printing app 21b is activated will be described. Notably, operations for cases where the business card printing app 21c to the photo printing app 21e are activated are similar to the above, thus the description thereof will be omitted.

In S420, the map printing app 21b reads data related to the map printing app 21b from the status table 42. In S430, the map printing app 21b determines whether or not the data related to the map printing app 21b (e.g., the activated date 303) is already stored in the status table 42. In a case of a negative determination (S430: NO), it is determined that the map printing app 21b is to be activated for the first time. Then, the map printing app 21b proceeds to S440.

In S440, the map printing app 21b executes an initial activation process for its initial installation. The initial activation process for the initial installation is a process that is executed when the map printing app 21b is installed in the portable phone 10 for the first time, and it is activated for the first time. In this process, an installation state 305 indicating "installed", a version 306, and an app URL 307 are written in the status table 42 (see region R51). Further, in this process, a screen for user agreements may be displayed on the panel 18. Then, the map printing app 21b proceeds to S470.

On the other hand, in S430, in a case of an affirmative determination (S430: YES), it is determined that the map printing app 21b had been activated in the past. Then, the map printing app 21b proceeds to S450.

In S450, the map printing app 21b determines whether or not it is the initial activation after reinstallation. Specifically, if the installation state 305 in the status table 42 is "not installed", it can be determined that this is the initial activation after reinstallation. In a case of an affirmative determination (S450: YES), the map printing app 21b proceeds to S460. In S460, the map printing app 21b executes an initial activation process for reinstallation. The initial activation process for reinstallation is a process that is executed when the map printing app 21b is reinstalled in the portable phone 10, and it is activated for the first time after the reinstallation. In this process, the installation state 305 indicating "installed", the version 306, and the app URL 307 are written in the status table 42. Further, in this process, the screen for user agreements may not be displayed on the panel 18. Further, an image notifying that the map printing app 21*b* had once been installed in the past may be displayed on the panel 18. Then, the map printing app 21*b* proceeds to S470.

In S470, the map printing app 21*b* executes an update process of the status table 42. Specifically, the latest activated date 303, the latest activation number 304, and the like are stored in the status table 42. In S480, the map printing app 21*b* executes various processes. An example of such various processes may be processes to send map data to the MFP 110, and cause the MFP 110 to print a map. Thereafter, the map printing app 21*b* terminates the flow.

(Effects)

A case will be considered in which four app icon images are displayed in the main screen G1 of the printing app 21*a* for activating the four apps, namely the map printing app 21*b* to the photo printing app 21*e*. Further, a case will be assumed in which the business card printing app 21*c* is not installed in the portable phone 10, as shown in a region R31 of the status table 42 of FIG. 6. In this case, when the app icon images of the map printing app 21*b*, the CD label printing app 21*d*, and the photo printing app 21*e* are selected (S305: Y), the OS 21*g* activates these apps by the deep link function (S330) since these apps are already installed (S320: YES). However, when the app icon image corresponding to the business card printing app 21*c* is selected (S305: Y), the OS 21*g* displays the relevant web page (S340) by the WebView function because this app is not currently installed (S320: NO). Due to two types of operations being concurrently executed when those app icon images are selected, this may confuse the user. Thus, the printing app 21*a* described herein configured to write the installation states 305 in the status table 42 from the respective apps (S470). The printing app 21*a* reads the installation states 305 from the status table 42 upon the activation (S110). Due to this, the printing app 21*a* can identify the apps installed in the portable phone 10. Thus, the app icon images are generated (S210) only for the already-installed apps, and as such, only those app icon images can be displayed on the main screen G1 (S230). That is, only the three app icon images for activating the three apps, namely the map printing app 21*b*, the CD label printing app 21*d*, and the photo printing app 21*e*, can be displayed. Thus, no confusion will occur for the user.

Although the OS 21*g* can identify whether or not the selected app is installed in the portable phone 10, the printing app 21*a* does not have any means for doing so. Further, the printing app 21*a* cannot inquire the OS 21*g* regarding the installation of the selected app either. Thus, it had been difficult for the printing app 21*a* to identify presence or absence of the installation of the selected app. However, the printing app 21*a* is capable of detecting whether or not the OS 21*g* has displayed a web page using the WebView function (S250). Further, the OS 21*g* activates the selected app using the deep link function (S330) when the selected app is installed in the portable phone 10 (S320: YES), but the OS 21*g* displays the web page using the WebView function (S340) when the selected app is not installed in the portable phone 10 (S320: NO). Accordingly, the printing app 21*a* can indirectly identify whether or not the selected app is installed by detecting whether or not the execution of the WebView function by the OS 21*g* has been carried out (S250). That is, it becomes possible to allow the printing app 21*a* to identify the presence or absence of the installation of the selected app by using the WebView function and the deep link function in combination. Use of such an identification configuration regarding the presence or absence of the installation is a characteristic feature of the printing app 21*a* described herein.

The OS 21*g* is provided with an activation API for activating another app (e.g., the map printing app 21*b*) from the printing app 21*a* that is currently activated. However, there is a case where a limitation is set so that the activation using the activation API is allowed only for apps that are given a permission therefor in a white list provided in the printing app 21*a*. In such a case, if a new app that was published after the date of creation of the white list stored in the portable phone 10 needs to be activated from the printing app 21*a* using the activation API, the white list needs to be updated to its latest state. This may deteriorate user's convenience. According to the printing app 21*a* described herein, an app activation can be carried out using the deep link function provided in the OS 21*g* (S330). Since there is no need to use the activation API, the white list stored in the portable phone 10 does not need to be maintained in the latest state. Further, the status table 42 can be maintained automatically in its latest state by each of the plural apps (S470). The user does not need to maintain the latest state, as in the case of the aforementioned white list. The user's convenience can be enhanced.

According to the printing app 21*a* described herein, when the selected app is detected as not installed in the portable phone 10 (S250: NO), the installation state 305 of this app can be changed from "installed" to "not installed" (S270). Due to this, the printing app 21*a* can identify the app that had been uninstalled from the portable phone 10. Thus, the app icon image of the uninstalled app can be removed from the main screen G1 (S275). This allows dynamic display of the app icon images according to installation states of apps, so the user would not be confused.

According to the printing app 21*a* described herein, the uninstalled app can be detected (S250: NO), and the installation state 305 of this app can be changed from "installed" to "not installed" (S270). Due to this, the respective types of information of the uninstalled app (e.g., the activated date 303 and the activation number 304) can be left remaining in the status table 42. Then, when an app that is the same as the uninstalled app is reinstalled (S450: Y), the respective types of information remaining in the status table 42 can be inherited to the reinstalled app. Due to this, the initial activation process (S460) and the like can be executed upon the reinstallation.

According to the printing app 21*a* described herein, an app for which a predetermined period has elapsed since the previous activation can be detected (S150: YES), and the uninstallation notification image can be displayed (S160 and S230) in association with the detected app. Due to this, the possibility that "the app that had not been activated over the predetermined period might have been uninstalled" can be notified to the user.

According to the printing app 21*a* described herein, the display order of the installed apps can be sorted based on their activation numbers 304 (S220). Due to this, the app icon image with the higher rank in the display order can be displayed with greater priority (S230), and the user's convenience can be enhanced.

According to the printing app 21*a* described herein, the newly installed app can be detected (S130: YES), and the new installation notification image can be displayed (S140 and S230) in association with the detected app. Due to this, the presence of the newly installed app can be notified to the user.

According to the printing app 21*a* described herein, the app with a newer version than the currently installed version can be detected (S180: YES), and the update notification image can be displayed (S190 and S230) in association with the detected app. Due to this, the presence of the app with an older version can be notified to the user.

According to the printing app 21*a* described herein, the status table 42 can be read (S110) in accordance with the activation of the printing app 21*a* (S90). The printing app 21*a* can execute various processes based on the contents of the latest status table 42.

Second Embodiment

The first embodiment was configured to let the various types of information (e.g., the activated date 303 and the activation number 304) of the uninstalled app left remaining in the status table 42. The second embodiment is configured to store the various types of information in the status table 42, only for the apps that are installed in the portable phone 10. That is, in the second embodiment, the various types of information of the uninstalled app is not left remaining in the status table 42. Other contents are same in the first and second embodiments. Further, the effects of the second embodiment are similar to those of the first embodiment. Hereinbelow, features by which the second embodiment differs from the first embodiment will mainly be described.

Figure 9:
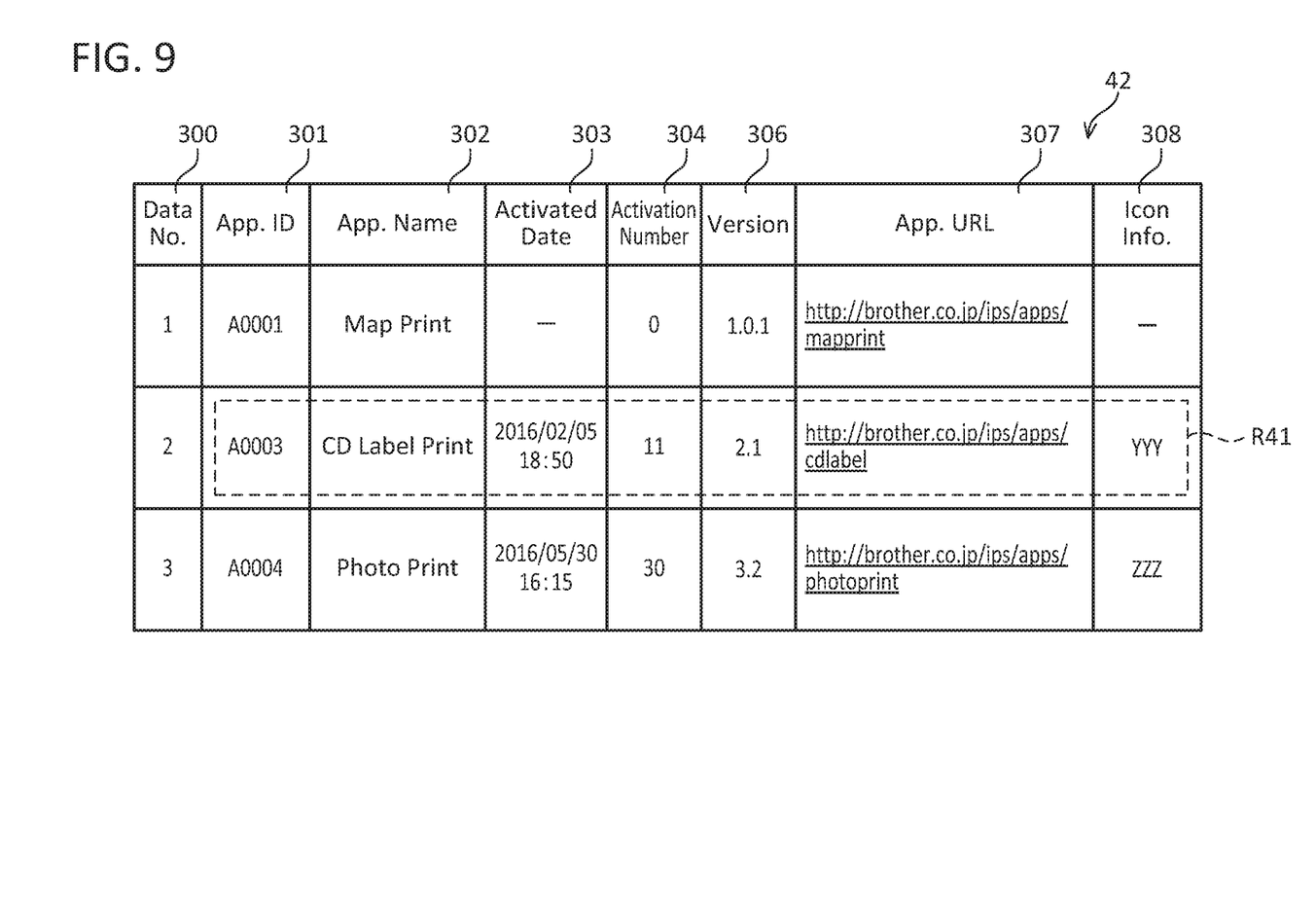
FIG. 9 shows an example of a status table 42 to be used in a second embodiment.

FIG. 9 shows an example of the status table 42 used in the second embodiment. The status table of the second embodiment does not store the installation states 305. In the explanatory example of the second embodiment, a case will be described in which the map printing app 21*b*, the CD label printing app 21*d*, and the photo printing app 21*e* are installed in the portable phone 10. Thus, the status table 42 does not store the app ID 301 to the icon information 308 for the business card printing app 21*c*.

In S120, the printing app 21*a* determines that the Nth app is an app installed in the portable phone 10. This is because only the data for the apps installed in the portable phone 10 will be read in S110.

An operation example for S250 to S275 of the second embodiment will be described. In the explanatory example of the second embodiment, a case will be described in which the CD label printing app 21*d* had been uninstalled under a situation in which the various types of information for the CD label printing app 21*d* are not yet deleted from the status table 42 (see FIG. 9, region R41). A case will be described in which the CD label printing app 21*d* is selected as the selected app in S305. In this case, the printing app 21*a* detects the display of the web page and determines that the CD label printing app 21*d* is not installed in the portable phone 10 (S250: NO). Thus, the printing app 21*a* deletes the various types of information of the CD label printing app 21*d* (see region R41) (S270). Further, the app icon image I2 of the CD label printing app 21*d* is deleted (S275). Due to this, the state is achieved as shown in a main screen G1*a* shown in FIG. 8, in which the app icon images I1 and I3 are displayed.

(Effects)

According to the printing app 21*a* described in the second embodiment, when the selected app is detected as not installed in the portable phone 10 (S250: NO), the information related to this app can be deleted from the status table 42 (S270). Due to this, the printing app 21*a* can identify only the app installed in the portable phone 10 (S120). As such, since the app icon images can be displayed dynamically according to their states of installation, the user will not be confused.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

(Modifications)

The icon information 308 is not limited to the path, but may be the app icon image itself.

The configuration of the priority display of the app icon images in S230 may vary. For example, the app icon image with the greater rank in the display order may be displayed larger, or may be displayed with emphasis.

The new installation notification image (S140), the uninstallation notification image (S160), and the update notification image (S190) may be various types of images. For example, each of them may be a pop-up image including letter strings.

The activatable app is not limited to apps for controlling the MFP 110, such as the map printing app 21*b* to the photo printing app 21*e*. Various types of apps, such as an email app or a browser app, may be activated from the printing app 21*a*.

The platform of the portable phone 10 is not limited to iOS, and various other platforms may be utilized. For example, it may be Android (registered trademark), Windows phone (registered trademark), or the like.

At least one of the processes for generating the new installation notification image (S140), the uninstallation notification image (S160), and the update notification image (S190) may be omitted. The process of sorting the display order (S220) may be omitted. The initial activation process (S440) upon the initial installation and the initial activation process (S460) upon the reinstallation may be omitted. As above, in a generalized term, the printing application 21*a* simply needs to cause the portable phone 10 to perform the processes for "reading first identification information", "displaying first screen", and "causing the operating system to display K pieces of first images". A specific example thereof is that the printing application 21*a* simply needs to cause the portable phone 10 to perform S110 and S230.

The mobile phone 10 may perform wireless communication according to a Wi-Fi system, and carry out communication of various kinds of information with the Web server 100. In a case where the mobile phone 10 is connected by wire to the Internet 70, the mobile phone 10 may perform wire communication and carry out communication with the Web server 100. Generally speaking, any kind of communication system may be adopted as long as it is possible for the mobile phone 10 and the Web server 100 to communicate with each other.

A device on which the print application 21*a* operates is not limited to the mobile phone 10, and may be a stationary PC or may be another device (for example, a television or the like).

"A set of first and second non-transitory computer-readable recording mediums" encompasses a broad range of concept. For example, the set of these mediums may be a storage (e.g., HDD, SSD) which the web server 100 comprises. Alternatively, the set of these mediums may be the memory 12 of the portable phone 10.

In the respective embodiments described above, the respective processing operations illustrated in FIG. 2 to FIG. 5 and the like are realized by the CPU 11 of the mobile phone 10 executing programs stored in the memory 12. However, a configuration may also be adopted in which, instead, at least one of the respective processing operations illustrated in FIG. 2 to FIG. 5 and the like is realized by hardware such as a logical circuit.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

The panel 18 is an example of a display. The button input I/F 17 is an example of an operation unit. The portable phone 10 is an example of an information processing device. The printing application 21a is an example of an information processing instructions. The map printing app 21b to the photo printing app 21e are an example of L pieces of applications. The installation state 305 is an example of first identification information. The app ID 301, the activated date 303, and the version 306 are examples of the first identification information. The CPU executing S110 is an example of "reading first identification information". The CPU executing S120 is an example of "extracting the K pieces of first applications identified by the first identification information". The app icon images I1 to I3 are examples of a first image. The CPU executing S230 is an example of "causing the operating system to display the K pieces of first images". The app URL 307 is an example of an application URL. The CPU executing S250 is an example of "detecting whether or not the operating system executed the web page display process". The CPU executing S270 is an example of "changing the installation information" and "deleting the first identification information". The path to the location where the app icon image is stored is an example of image information. The CPU executing S150 is an example of "determining whether or not a predetermined period has elapsed since the previous activation time". The uninstallation notification image is an example of a second image. The CPU executing S220 is an example of "determining a display order". The icon generation information is an example of second identification information. The CPU executing S215 is an example of "storing second identification information". The CPU executing S130 is an example of "determining whether or not a new first application exists". The new installation notification image is an example of a third image. The portable phone I/F 20 is an example of a communication interface. The CPU executing S170 is an example of "acquiring latest version information". The CPU executing S180 is an example of "determining whether or not a first application with an old version exists". The update notification image is an example of a fourth image.

What is claimed is:

1. A non-transitory computer-readable recording medium storing a specific application program that configure information processing instructions for an information processing device that comprises: a controller; a memory a display; and a user interface,
   the information processing device in which an operating system is installed, and
   the operating system being configured to control the memory, the display, and the user interface,
   the specific application program, when executed by the controller, causes the information processing device to perform:
   reading each of K pieces of application URLs that is uniquely associated with corresponding one of K pieces of first applications,
      K being an integer equal to or greater than one,
      the K pieces of application URLs being stored in the memory when the K pieces of first applications are installed in the information processing device,
      each application URL being a URL capable of causing the operating system to execute an application activation process when the application URL is read by the operating system, and
      the application activation process being a process of activating an associated application that is associated with the read application URL;
   generating K pieces of first images, wherein:
      each of the K pieces of first images corresponds to one of the K pieces of application URLs read by the reading, and
      each of the K pieces of first images indicates a corresponding one of the K pieces of first applications;
   displaying a first screen on the display;
   causing the operating system to execute a specific process such that the K pieces of the generated first images are displayed in the first screen,
      the specific process being a process of displaying a web page;
   in a case that an input operation for selecting a selected first image from among the K pieces of first images is received via the user interface and in a case that an associated first application associated with a selected application URL corresponding to the selected first image is installed in the information processing device, activating the associated first application according to the application activation process executed by the operating system; and
   in a case of determining that a specific first application that is at least one of the first applications is not installed, not displaying a specific first image on the first screen, the specific first image being corresponding to the specific first application.

2. The non-transitory computer-readable recording medium according to claim 1, wherein:
   the operating system is provided with a function to access a web page designated by the application URL,
   the specific application program, when executed by the controller of the information processing device, further causes the information processing device to perform:
      causing the operating system to display a web page according to the application URL associated with the associated first application on the display, in a case that the input operation is received via the user interface and in a case that the associated first application is not installed in the information processing device or is already uninstalled from the information processing device; and
      causing the operating system to activate the associated first application, in a case that the input operation is received via the user interface and in a case that the associated first application is installed in the information processing device.

3. The non-transitory computer-readable recording medium according to claim 2, wherein:

installation information or no-installation information is stored in the memory associated with each of the K pieces of first applications, the installation information indicates that the first application associated with the installation information is installed in the information processing device, the no-installation information indicates that the first application associated with the no-installation information is not installed in the information processing device or is already uninstalled from the information processing device, the specific application program, when executed by the controller of the information processing device, further cause the information processing device to perform:

detecting whether or not the operating system displayed the web page when the input operation is received via the user interface; and changing the installation information associated with the associated first application to the no-installation information in a case that the detecting has detected that the operating system displayed the web page.

4. The non-transitory computer-readable recording medium according to claim 2, wherein:

the specific application program, when executed by the controller of the information processing device, further cause the information processing device to perform:

detecting whether or not the operating system displayed the web page when the input operation is received via the user interface; and deleting the application URL associated with the associated first application from the memory in a case that the detecting has detected that the operating system displayed the web page.

5. The non-transitory computer-readable recording medium according to claim 1, wherein:

the memory stores image information related to each of the K pieces of first images, and the causing includes causing the operating system to execute the specific process based on the image information.

6. The non-transitory computer-readable recording medium according to claim 1, wherein:

the memory stores time information for each of the K pieces of first applications, each time information indicating previous activation time when the corresponding first application was previously activated, the specific application program, when executed by the controller of the information processing device, further cause the information processing device to perform determining whether or not a predetermined period has elapsed since the previous activation time based on the time information for each of the K pieces of first applications, and the causing the operating system to execute the specific process includes causing the operating system to execute the specific process such that a second image related to a first application for which predetermined period has elapsed is displayed on the display, in a case where it is determined in the determining that the first application for which predetermined period has elapsed exists.

7. The non-transitory computer-readable recording medium according to claim 1, wherein:

the memory stores an activation number for each of the K pieces of first applications, each activation number indicating a number of times the corresponding first application had been activated, the specific application program, when executed by the controller of the information processing device, further cause the information processing device to perform determining a display order for the K pieces of first applications based on the activation numbers, and the causing the operating system to execute the specific process includes causing the operating system to execute the specific process such that a first image with a higher display order as determined in the determining is displayed with a higher priority.

8. The non-transitory computer-readable recording medium according to claim 1, wherein:

the specific application program, when executed by the controller of the information processing device, further causes the information processing device to perform storing identification information in the memory, the identification information indicating one or more first applications for which one or more first images are generated, the reading further includes reading the identification information from the memory in addition to the K pieces of application URLs, the specific application program, when executed by the controller of the information processing device, further causes the information processing device to perform determining whether or not a new first application that is not included in the one or more first application indicated by the identification information exists among the K pieces of applications indicated by the K pieces of application URLs, and the causing the operating system to execute the specific process includes causing the operating system to execute the specific process such that a third image related to the new first application is displayed on the display, in a case where it is determined in the determining that the new first application exists.

9. The non-transitory computer-readable recording medium according to claim 1, wherein:

the information processing device further includes a communication interface for communicating with a server, the memory stores K pieces of first version information for each of the K pieces of first applications, and each first version information indicating a current version of the corresponding first application, the reading further includes reading the K pieces of first version information from the memory, the specific application program, when executed by the controller of the information processing device, further causes the information processing device to perform:

acquiring K pieces of latest version information indicating a latest version of each of the K pieces of first applications from the server via the communication interface; and determining whether or not a first application with an old version exists by comparing the current versions of the K pieces of first applications indicated by the K pieces of first version information read in the reading and the latest versions of the K pieces of first applications indicated by the K pieces of latest version information acquired in the acquiring, and the execution of the specific process includes causing the operating system to execute the specific process such that a fourth image related to the first application with the old version is displayed on the display, in a case where it is determined in the determining that the first application with the old version exists.

10. The non-transitory computer-readable recording medium according to claim 1, wherein
the reading is performed when the specific application program is activated in the information processing device.

11. An information processing device that comprises: a controller; a memory storing a specific application program that configure information processing instructions; a display; and a user interface,
the information processing device in which an operating system is installed, and
the operating system being configured to control the memory, the display, and the user interface;
wherein the specific application program, when executed by the controller, causes the information processing device to perform:
reading each of K pieces of application URLs that is uniquely associated with corresponding one of K pieces of first applications,
K being an integer equal to or greater than one,
the K pieces of application URLs being stored in the memory when the K pieces of first applications are installed in the information processing device,
each application URL being a URL capable of causing the operating system to execute an application activation process when the application URL is read by the operating system,
the application activation process being a process of activating an associated application that is associated with the read application URL;
generating K pieces of first images, wherein
each of the K pieces of first images corresponds to one of the K pieces of application URLs read by the reading, and
each of the K pieces of first images indicates a corresponding one of the K pieces of first applications;
displaying a first screen on the display;
causing the operating system to execute a specific process such that the K pieces of the generated first images are displayed in the first screen,
the specific process being a process of displaying a web page;
in a case that an input operation for selecting a selected first image from among the K pieces of first images is received via the user interface and in a case that an associated first application associated with a selected application URL corresponding to the first image is installed in the information processing device, activating the associated first application according to the application activation process executed by the operating system; and
in a case of determining that a specific first application that is at least one of the first applications is not installed, not displaying a specific first image on the first screen, the specific first image being corresponding to the specific first application.

12. A method for controlling an information processing device,
the information processing device comprising: a controller; a memory; a display; and a user interface,
the information processing device in which a specific application program and an operating system are installed, and
the operating system being configured to control the memory, the display, and the user interface,
the method that is executed when the specific application program is executed by the controller, the method comprising:
reading each of K pieces of application URLs that is uniquely associated with corresponding one of K pieces of first applications,
K being an integer equal to or greater than one, and
the K pieces of application URLs being stored in the memory when the K pieces of first applications are installed in the information processing device,
each application URL being a URL capable of causing the operating system to execute an application activation process when the application URL is read by the operating system, and
the application activation process being a process of activating an associated application that is associated with the read application URL;
generating K pieces of first images, wherein
each of the K pieces of first images corresponds to one of the K pieces of application URLs read by the reading, and
each of the K pieces of first images indicates a corresponding one of the K pieces of first applications;
displaying a first screen on the display;
causing the operating system to execute a specific process such that the K pieces of the generated first images are displayed in the first screen,
the specific process being a process of displaying a web page;
in a case that an input operation for selecting a selected first image from among the K pieces of first images is received via the user interface and in a case that an associated first application associated with a selected application URL corresponding to the first image is installed in the information processing device, activating the associated first application according to the application activation process executed by the operating system; and
in a case of determining that a specific first application that is at least one of the first applications is not installed, not displaying a specific first image on the first screen, the specific first image being corresponding to the specific first application.

* * * * *

UNITED STATES PATENT AND TRADEMARK OFFICE
CERTIFICATE OF CORRECTION

PATENT NO. : 10,970,020 B2  
APPLICATION NO. : 16/442958  
DATED : April 6, 2021  
INVENTOR(S) : Takeshi Shiotani Page 1 of 2

It is certified that error appears in the above-identified patent and that said Letters Patent is hereby corrected as shown below:

On the Title Page

(57) Abstract, Line 4 should read:  
information processing device may display a first screen on In the Claims Column 13, Claim 1, Line 62 should read:  
storing a specific application program that configures infor- Column 13, Claim 1, Line 64 should read:  
ing device that comprises: a controller; a memory; a display;

Column 14, Claim 1, Line 4 should read:  
controller, causing the information processing device to Column 14, Claim 1, Line 7 should read:  
uniquely associated with a corresponding one of K pieces Column 15, Claim 3, Line 14 should read:  
causes the information processing device to perform:

Column 15, Claim 4, Line 26 should read:  
causes the information processing device to perform:

Column 16, Claim 7, Line 3 should read:  
causes the information processing device to perform Column 16, Claim 8, Line 28 should read:  
is not included in the one or more first applications Signed and Sealed this  
Third Day of August, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,970,020 B2

Column 17, Claim 11, Line 8 should read:
that configures information processing instructions; a dis- Column 17, Claim 11, Line 13 should read:
memory, the display, and the user interface, Column 17, Claim 11, Line 18 should read:
uniquely associated with a corresponding one of K pieces Column 18, Claim 12, Line 16 should read:
uniquely associated with a corresponding one of K pieces